(12) United States Patent
Scalisi et al.

(10) Patent No.: US 7,598,855 B2
(45) Date of Patent: Oct. 6, 2009

(54) APPARATUS AND METHOD FOR LOCATING INDIVIDUALS AND OBJECTS USING TRACKING DEVICES

(75) Inventors: Joseph F. Scalisi, Yorba Linda, CA (US); David Morse, Laguna Hills, CA (US); Desiree C. Mejia, Anaheim, CA (US)

(73) Assignee: Location Based Technologies, Inc., Anaheim, CA (US)

( * ) Notice: Subject to any disclaimer, the term of this patent is extended or adjusted under 35 U.S.C. 154(b) by 465 days.

(21) Appl. No.: 11/491,370

(22) Filed: Jul. 21, 2006

(65) Prior Publication Data

US 2006/0255935 A1    Nov. 16, 2006

Related U.S. Application Data

(63) Continuation-in-part of application No. 11/048,395, filed on Feb. 1, 2005.

(51) Int. Cl.
*G08B 1/08* (2006.01)
(52) U.S. Cl. .............. 340/539.13; 340/539.1; 340/539.11; 340/825.36; 340/825.49; 340/506
(58) Field of Classification Search ............. 340/539.1, 340/539.11, 539.13, 506, 825.36, 825.49
See application file for complete search history.

(56) References Cited

U.S. PATENT DOCUMENTS

| | | | |
|---|---|---|---|
| 6,388,612 B1 | 5/2002 | Neher | |
| 6,608,559 B1 * | 8/2003 | Lemelson et al. | 340/539.13 |
| 6,674,368 B2 | 1/2004 | Hawkins et al. | |
| 6,812,824 B1 | 11/2004 | Golddinger | |
| 6,998,985 B2 | 2/2006 | Reisman et al. | |
| 6,998,995 B2 | 2/2006 | Nakajima | |
| 7,038,590 B2 | 5/2006 | Hoffman et al. | |
| 7,049,957 B2 | 5/2006 | Watson | |
| 7,064,711 B2 | 6/2006 | Strickland et al. | |
| 7,065,244 B2 | 6/2006 | Akimov | |
| 7,065,348 B1 | 6/2006 | Aoki | |
| 7,065,370 B2 | 6/2006 | Ogaki et al. | |
| 7,088,252 B2 | 8/2006 | Weekes | |
| 7,120,928 B2 | 10/2006 | Steth et al. | |
| 7,146,367 B2 | 12/2006 | Shutt | |
| 7,149,189 B2 | 12/2006 | Huntington et al. | |
| 7,155,238 B2 | 12/2006 | Katz | |
| 7,272,212 B2 | 9/2007 | Eberle et al. | |
| 7,272,662 B2 | 9/2007 | Chesnais et al. | |
| 2001/0048364 A1 | 12/2001 | Kalthoft et al. | |

(Continued)

*Primary Examiner*—Daryl Pope
(74) *Attorney, Agent, or Firm*—Law Office of Robert E. Kasody, P. C.

(57) ABSTRACT

A system for monitoring objects and individuals. In this system, a monitoring station is remotely accessible through a user interface. The interface is adapted to provide a visually cognizable rendering of an area and a tool useful for selecting at least a portion of said area, and to communicate a first request signal to provide location coordinates of a first tracking device. The first tracking device comprises a first transceiver adapted to receive the first request signal, and to transmit a first reply signal that comprises a first identification code. In addition, a second tracking device having a second transceiver is adapted to receive the first reply signal, compare the first identification code to a stored identification code, and communicate to the monitoring station a second reply signal that comprises location coordinates of the first tracking device in part responsive to verification of the first identification code.

17 Claims, 13 Drawing Sheets

U.S. PATENT DOCUMENTS

2002/0067256 A1 6/2002 Kail, IV
2002/0186135 A1 12/2002 Wagner
2006/0009152 A1 1/2006 Millard
2006/0232429 A1 10/2006 Gonzalez
2006/0232449 A1 10/2006 Gonzalez

* cited by examiner

APPARATUS AND METHOD FOR LOCATING INDIVIDUALS AND OBJECTS USING TRACKING DEVICES

PRIORITY

This application is a continuation-in-part (CIP) of and claims priority to U.S. patent application Ser. No. 11/048,395, filed on Feb. 1, 2005, entitled "System for Locating Individuals and Objects" which is incorporated herein by reference in its entirety.

BACKGROUND OF THE INVENTION

1. Field of the Invention

The invention relates generally to the field of communications systems that provide location information. More particularly, the present invention relates in one embodiment to a system for monitoring location information of a tracking unit associated with an individual or object that uses wireless data transfer and/or wireless location and tracking systems and wireless communication system (WCS).

2. Description of Related Technology

In conventional communication systems, location information of individuals may be monitored. For instance, location information such as positional coordinates may be tracked or monitored for a variety of individuals, such as children, Alzheimer's syndrome patients, or mentally ill persons. Furthermore, location information for animals, such as cats and dogs, may be tracked using these conventional systems to locate a lost or stolen animal. In other conventional communication systems, scientists, such as zoologists, track, for example, wild animals to study and collect data related to their mating and/or nocturnal behavioral patterns.

In addition, objects are also tracked or located that use these systems. For example, merchants choose to track the location of goods as part of an inventory function and/or an anti-theft mode. In another example, police often use location-tracking systems to facilitate recovery of stolen automobiles, such as the LoJack™ vehicle recovery system offered by the LoJack Corporation of Westwood, Mass, in the United States. Automobile rental agencies often track a location of automobiles that customers rent to ensure their automobile is maintained within a contracted rental use boundary. Other location systems provided in select automobiles assist a driver navigating to a desired destination, such as the OnStar™ system offered by the OnStar Corporation of Detroit, Mich, in the United States.

Global Positioning System (GPS) technology may be incorporated in these conventional communication systems. GPS technology determines positional information of a GPS receiver based on measuring signal transfer times between satellites having known positions and the GPS receiver. The signal transfer time of a signal is proportional to a distance of a respective satellite from the GPS receiver. Consequently, the distance between the satellite and the GPS receiver can be converted, utilizing signal propagation velocity, into a respective signal transfer time. The positional information of the GPS receiver is calculated based on distance calculations from at least four satellites.

As such, GPS technology provides outdoor, line-of-sight communication between a GPS receiver and a centralized station within areas that are unobstructed by fabricated structures and natural features. Fabricated structures may include multi-story buildings, bridges, dams, and the like. Natural features include mountains, hills, valleys, canyons, cliffs, and the like. Exemplary products, such as Wherifone™ and Guardian Lion™, use GPS technology to track individuals and/or objects from a centralized monitoring station.

A graphical map may be provided with a conventional centralized monitoring station. For instance, the graphical map may be two dimensional, or even a three-dimensional, topological map that depicts landscaping, marine, or other environments. The map typically displays representative icons of individuals and/or objects being tracked. In one example, a mobile device may display the three-dimensional map, including primary regions and sub-regions that are preprogrammed to create a series of overlay maps for viewing on a computer display. In yet another example, map information of a first and second user terminal is synthesized; a map is chosen based on the map information from the database; and the map information is displayed on at least one of the first user and the second user terminal. In another GPS conventional communication example, GPS positioning information is transmitted from a GPS unit and between peripheral devices, such as between a camera and a Palm Pilot, through a local wireless communication unit or interface.

GPS systems generally representative of the above apparatuses include, e.g., those described in U.S. Pat. No. 7,064,711 to Strickland et al. entitled "Method for Iterative Determination of Distance between Receiving Station and Transmitting Station and Also Calculating Unit and Computer Software Product" issued Jun. 20, 2006. In yet another example, U.S. Pat. No. 7,065,244 to Akimov issued on Jun. 20, 2006, and entitled "Method for Mapping a Three Dimensional Area" demonstrates the above GPS systems.

Still other representative prior art patents include U.S. Pat. No. 7,065,370 to Ogaki et al. entitled "Positioning Information Transmitting Device and Positioning Information Transmitting/Receiving System" issued on Jun. 20, 2006, and U.S. Pat. No. 7,065,348 to Aoki entitled "Communication System for Providing Information on Position of Communication Party" Also issued on Jun. 20, 2006.

In summary, the prior art provides a user limited flexibility to adjust a controlled monitoring area about an object. In addition, the prior art provides limited flexibility for a user choosing and creating custom maps for viewing and locating objects. Furthermore, the prior art has limited capability for viewing objects by a remotely located user. Finally, the prior art has limited ability calculating positional data of objects when GPS signaling is not available.

Thus, what is needed are apparatus and methods for wireless data transfer and/or wireless location and tracking systems that provide additional advantages over conventional systems. These advantages would include, inter alia, calculating positional data and location coordinates of tracking devices when GPS signaling is unavailable, providing graphical displays for subscribers which aid monitoring and tracking objects and/or individuals, and/or providing security measures when monitoring tracking devices to prevent unauthorized detection and spying on individuals.

SUMMARY OF THE INVENTION

In a first aspect of the present invention, a system for tracking is disclosed. In one embodiment of this system, a monitoring station is remotely accessed through a user interface. The interface is adapted to provide a visually cognizable rendering of an area and a tool useful for selecting at least a portion of said area, and to communicate a first request signal to provide location coordinates of a first tracking device. The first tracking device includes a first transceiver adapted to receive the first request signal, and to transmit a first reply signal that comprises a first identification code. A second tracking device is also provided having a second transceiver that is adapted to receive the first reply signal, compare the first identification code to a stored identification code, and communicate to the monitoring station a second reply signal. The second reply signal includes location coordinates of the first tracking device in part responsive to verification of the first identification code.

In a second aspect of the invention, a system is disclosed comprising a first and a second tracking device. In one embodiment, the first tracking device has a first transceiver to receive a first request signal and to transmit a first reply signal. The first reply signal comprises first location data, a first microprocessor to process a first request signal provided through a subscriber interface that is remotely located, and a first identification code that is communicated as part of a first reply signal. In addition, a second tracking device has a second tracking transceiver that receives the first reply signal, and verifies the first identification code as a recognized code. In response to verification, the second tracking device communicates a second reply signal that comprises a second identification code to the first tracking device. In response to the second reply signal, the first tracking device calculates a relative distance between the first and the second devices. Furthermore, the first tracking device communicates an adjustment signal that comprises verbal or audio queues that indicate directional information of the first tracking device in relation to the second tracking device.

In a third aspect of the present invention, a method is disclosed for locating an individual or an object. In one embodiment, the method includes receiving a location request from a user and activating a positioning apparatus associated with the tracking device. The method further includes transmitting to a tracking device: a first signal from a monitoring station, a second signal from a wireless location and tracking system, a third signal from a mobile transceiver, and a fourth signal from an adjacent tracking device. The method further includes determining which of the first signal, the second signal, the third signal, and the fourth signal match defined selection criteria that is stored in the tracking device. The method may further include the steps of determining location data in part based on a signal selected utilizing the defined selection criteria, transmitting the location data to the monitoring station for analysis to determine a location of the tracking device; and informing the user of the location of the tracking device on a map.

In a fourth aspect of the invention, a system for tracking object is disclosed. In one embodiment, the system includes a wireless monitoring device associated with a remote user, and a first tracking device that provides a wireless positioning signal to a monitoring station. A mapping apparatus is further included that maps first location coordinates of the first tracking device on a map comprising an arbitrarily shaped safe zone. The remote user, in one embodiment, is capable of locating, tracking, and communicating with the first tracking device through a monitoring station. Furthermore, the monitoring station may be adapted to monitor the first location coordinates and second location coordinates of a second tracking device so that positioning information of each is accessible to the remote user.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION

Figure 1A:
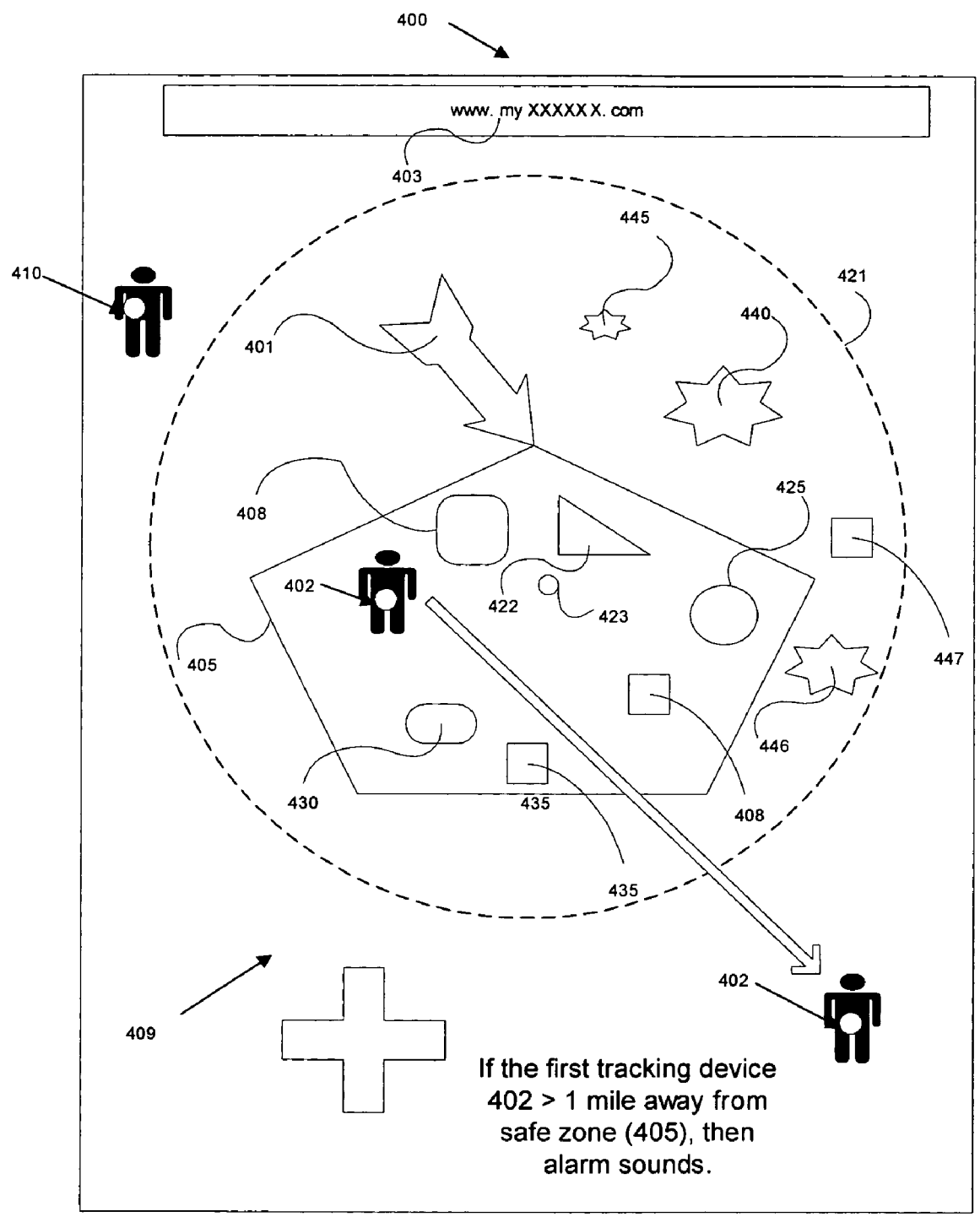
FIGS. 1A and 1B are graphical representations of a positioning and tracking system for defining an area (e.g., arbitrary shaped safe zone) in accordance with an embodiment of the present invention.

Reference is now made to the drawings wherein like numerals refer to like parts throughout.

As used herein, the terms "location coordinates" refer without limitation to any set or partial set of integer, real and/or complex location data or information such as longitudinal, latitudinal, and elevational positional coordinates. The terms "tracking device" refers to without limitation to any integrated circuit (IC), chip, chip set, system-on-a-chip, microwave integrated circuit (MIC), Monolithic Microwave Integrated Circuit (MMIC), low noise amplifier, power amplifier, transceiver, receiver, transmitter and Application Specific Integrated Circuit (ASIC) that may be constructed and/or fabricated. The chip or IC may be constructed ("fabricated") on a small rectangle (a "die") cut from, for example, a Silicon (or special applications, Sapphire), Gallium Arsenide, or Indium Phosphide wafer. The IC may be classified, for example, into analogue, digital, or hybrid (both analogue and digital on the same chip and/or analog-to-digital converter). Digital integrated circuits may contain anything from one to millions of logic gates, invertors, and, or, nand, and nor gates, flipflops, multiplexors, etc. on a few square millimeters. The small size of these circuits allows high speed, low power dissipation, and reduced manufacturing cost compared with board-level integration.

Furthermore, the terms "wireless data transfer," "wireless tracking and location system," "positioning system," and "wireless positioning system" refer without limitation to any wireless system that transfers and/or determines location coordinates using one or more devices, such as Global Positioning System (GPS). The terms "Global Positioning System" refers to without limitation any services, methods, or devices that utilize GPS technology that determine a position of a GPS receiver based on measuring signal transfer times between satellites having known position1s and the GPS receiver. The signal transfer time for a signal is proportional to a distance of the respective satellite from the GPS receiver. The distance between the satellite and the GPS receiver may be converted, utilizing signal propagation velocity, into the respective signal transfer time. The positional information of the GPS receiver is calculated based on distance calculations from at least four satellites. Furthermore, the term "wireless communication system" refers to any system that uses communication stations and a wireless location means for determining positional coordinates such as Global Positioning Radio Service (GPRS).

Overview

In one salient aspect, the present invention discloses apparatus and method of calculating, inter alia, determining location coordinates of a first tracking device. In particular, the first tracking device has a first transceiver. The first transceiver receives a first request signal from a remote user terminal equipped with a map. The first transceiver transmits a first reply signal including a first identification code. The second tracking device has a second transceiver. The second transceiver advantageously provides for receiving the first reply signal and comparing the first identification code to a stored identification code. Upon verification of the first identification code, the second transceiver calculates the location coordinates of the first tracking device without the need for the first tracking device directly connecting to GPS satellites. The second transceiver communicates a second reply signal to the monitoring station. The second reply signal comprises the location coordinates.

Broadly, the present invention generally provides a system and method for locating and tracking an individual or an object. The system produced according to the present invention may find beneficial use for locating and tracking people, such as missing, lost, or abducted persons, Alzheimer's syndrome patients, or mentally ill persons. The system may also be useful for locating and tracking animals. Additionally, objects, such as vehicles, goods, and merchandise may be located and tracked with the system produced by the present invention. Although the following discussion may use lost or abducted child as an exemplary demonstration, it is to be understood that this discussion is not limiting and that the present invention may be used in other suitable applications.

The present invention may be used to locate and track a tracking device that is concealed on an individual (such as in a pocket, backpack, shoe, button, shirt collar, woven into fabric of a jacket or sweater, or the like). Consequently, in the event of abduction, an abductor is unlikely to remove and discard a concealed tracking device as compared to conventional tracking devices that are conspicuously displayed. For example, conventional tracking devices are generally incorporated as part of a conspicuous device, such as with or part of a mobile phone, pager, personal data assistant, or any other recognizable electronic device.

Additionally, conventional systems depend upon maintaining direct outdoor line-of-sight communication between a global positioning system (GPS) satellite and a tracked object. The system of the present invention does not require direct line-of-sight and the system effectively locates and tracks individuals and objects in indoor situations.

Conventional systems often require an individual to activate manually a location system before signals can be received and transmitted between the individual and a person attempting to locate the individual. However, in one embodiment, the system of the present invention may be passive in that a user may remotely activate the tracking device, instead of the tracking device remaining constantly on, once the user attempts to locate the tracking device. In one embodiment of the invention, no action is required on the behalf of an individual having the tracking device being located and tracked. In yet another instance, one or more tracking devices may be remotely activated to monitor and determine location coordinates (or relative distance from a second tracking device) of a first tracking device. In yet another instance, a first tracking device, and a second tracking device are remotely monitored by a user using a wireless device, such as a cell phone, utilizing a monitoring station.

Exemplary Extension Apparatus—

Referring now to FIGS. 1-5, exemplary embodiments of the tracking and monitoring system of the invention are described in detail. It will be appreciated that while described primarily in the context of tracking individuals or objects, at least portions of the apparatus and methods described herein may be used in other applications, such as for example and without limitation. Some applications include control systems that monitor components such as transducers, sensors, and electrical and/or optical components within an assembly line process.

Moreover, it will be recognized that the present invention may find utility beyond purely tracking and monitoring concerns. For example, the "tracking device" and "user-defined mapping criteria" described subsequently herein may conceivably be utilized to improve other applications; e.g., increasing functionality and electrical properties of circuits utilized to improve computational efficiency and increase accuracy of calculated quantities. The calculated quantities may include velocity of objects traveling through an assembly line process for determining which portions of the process are running efficiently and which portions may require process improvements or modifications. Other functions might include module assembly (e.g., for purposes of providing transceivers that provide multiple methods and user choices for displaying electrical properties and measurement parameters during testing and/or operations before, during or after wireless module completion, and so forth). Myriad of other functions will be recognized by those of ordinary skill in the art given the present disclosure.

Figure 1B:
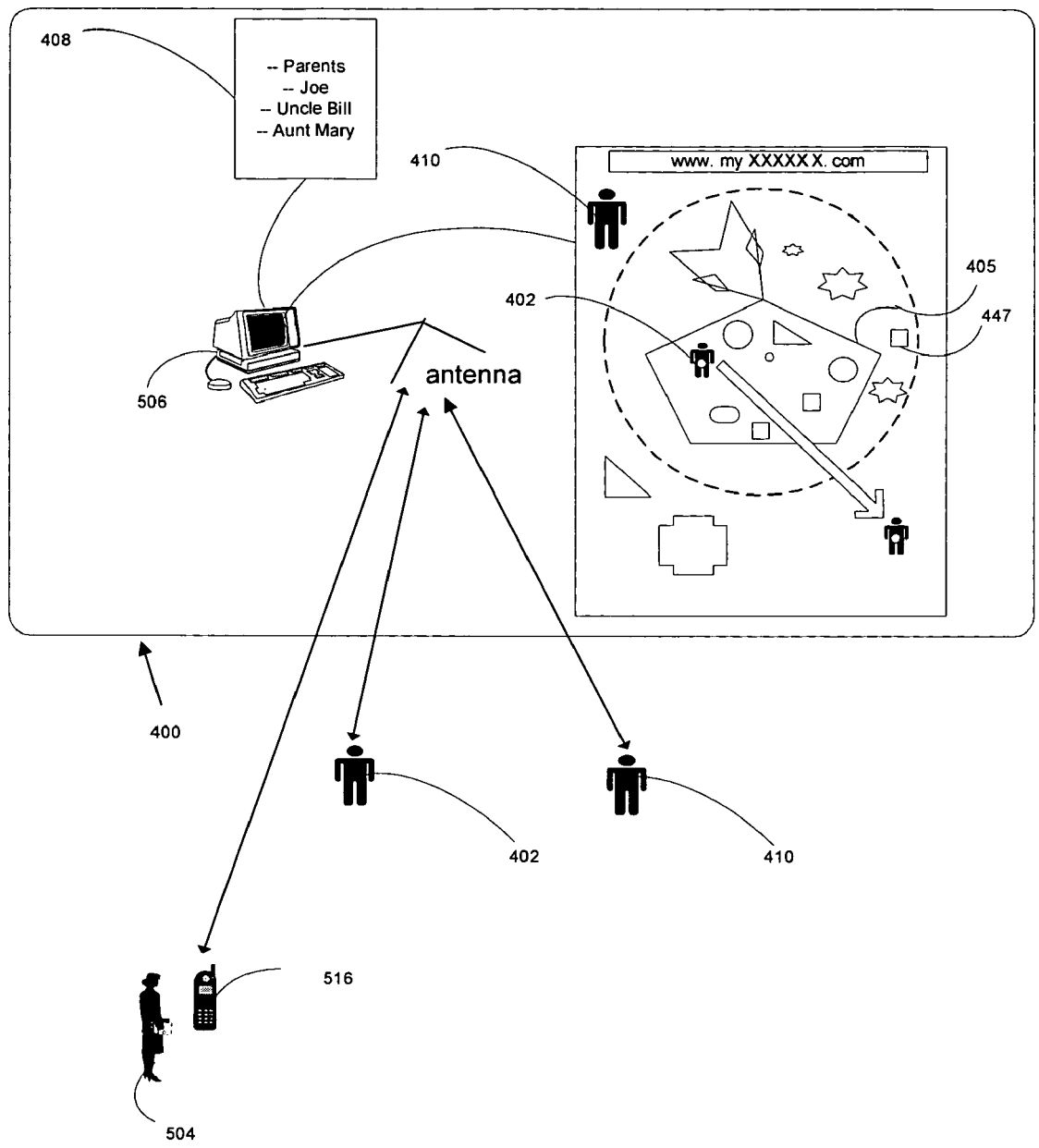

FIGS. 1A and 1B illustrate a positioning and tracking system 400 for defining an arbitrary shaped safe zone 405 in accordance with an embodiment of the present invention.

Referring to FIG. 1A, an image selection tool 401, e.g., screen pointer, is utilized to select a visually cognizable rendering of an area, e.g., selecting at least a portion of an area, on a subscriber interface 403, e.g., a web-based interface. The area selected by the image selection tool 401, for example, may be a safe zone 405. The safe zone 405 is an area that a user (a subscriber) specifies as a low injury risk area for individuals and/or objects. The safe zone 405 defined or described is specified utilizing one or more parameters. For instance, the safe zone 405, e.g., a home zone, may be specified, e.g., be establish by a user-defined mapping criteria using any of the following parameters: zip code boundaries, addresses, landmarks, buildings, mountain ranges, a WiFi hot spot, and distances from a specified location, such as one chosen by a subscriber. Upon the first tracking device 402 possessed by an individual traveling more than one mile from the safe zone 405, an alarm alert is sent to a user. In yet another example, an alarm is sent when the first tracking device 402 travels outside of a circularly shaped boundary 421 about a location 423, such as a WiFi network located in a coffee shop or "WiFi hot spot" designed area, within the safe zone 405.

Furthermore, the system 400 allows a user to draw an area such as a safe zone 405, which may be an arbitrary shaped zone, e.g., a closed shaped user-defined polygon or a circle. For instance, a parent and/or scoutmaster may enter the safe zone 405 that encompasses a small neighborhood 408, a school campus 425, a stadium 430, a national park 435, or the like, and excludes other areas such as an automobile repair shop 440, warehouse 445, and high automobile traffic areas 446. Upon a child having the first tracking device 402 leaving the user-defined polygon region, e.g., the safe zone 405, an alert such as an audible alarm will be sent to a parent or guardian of the child.

As shown in FIG. 1B, the system 400 attempts to contact individuals on a notification list 408 if the child enters a danger zone, such as a riverbed 447. The notification list 408 may be prepared in a subscriber-defined order. For instance, if a user 504, such as one of the parents, is first on the notification list 408, the system 400 communicates a message to the user 504 using email, SMS, voicemail, and telephone call. In one optional feature, an individual on the notification list 408 is required to confirm receipt of the message. Otherwise, the system 400 continues to contact other individuals on the notification list 408 until it receives a confirmation message from that individual. In another embodiment, the system 400 is time limited so that monitoring may be enabled or disabled based on or in response to user-defined features. Such user-defined features may include enabling or disabling monitoring during a specific time of day or day of the week.

For instance, the tracking features may be shut off on Saturday or Sunday or when the child is located in the home. In one variation of the present embodiment, multiple individuals or subscribers may establish (or share (e.g., pool) existing or newly established) user-defined features; including safe zones or periods, which may apply to one or multiple tracking devices, such a first and second tracking devices 402, 410. The pooling of subscriber's tracking devices provides an added benefit including synergy and sharing of electronic data so that one tracking device can benefit from electronics and/or positional location of other tracking devices. For example, a low signal level tracking device can utilize a nearby tracking device, such as one owned by another subscriber, to triangulate their signal to a satellite of a wireless tracking and location system, such as GPS satellite system. In yet another example, a low signal level-tracking device can utilize location coordinates of a nearby tracking device as its own so that a user 405 can determine an approximate location of the low level-tracking device.

Figure 2A:
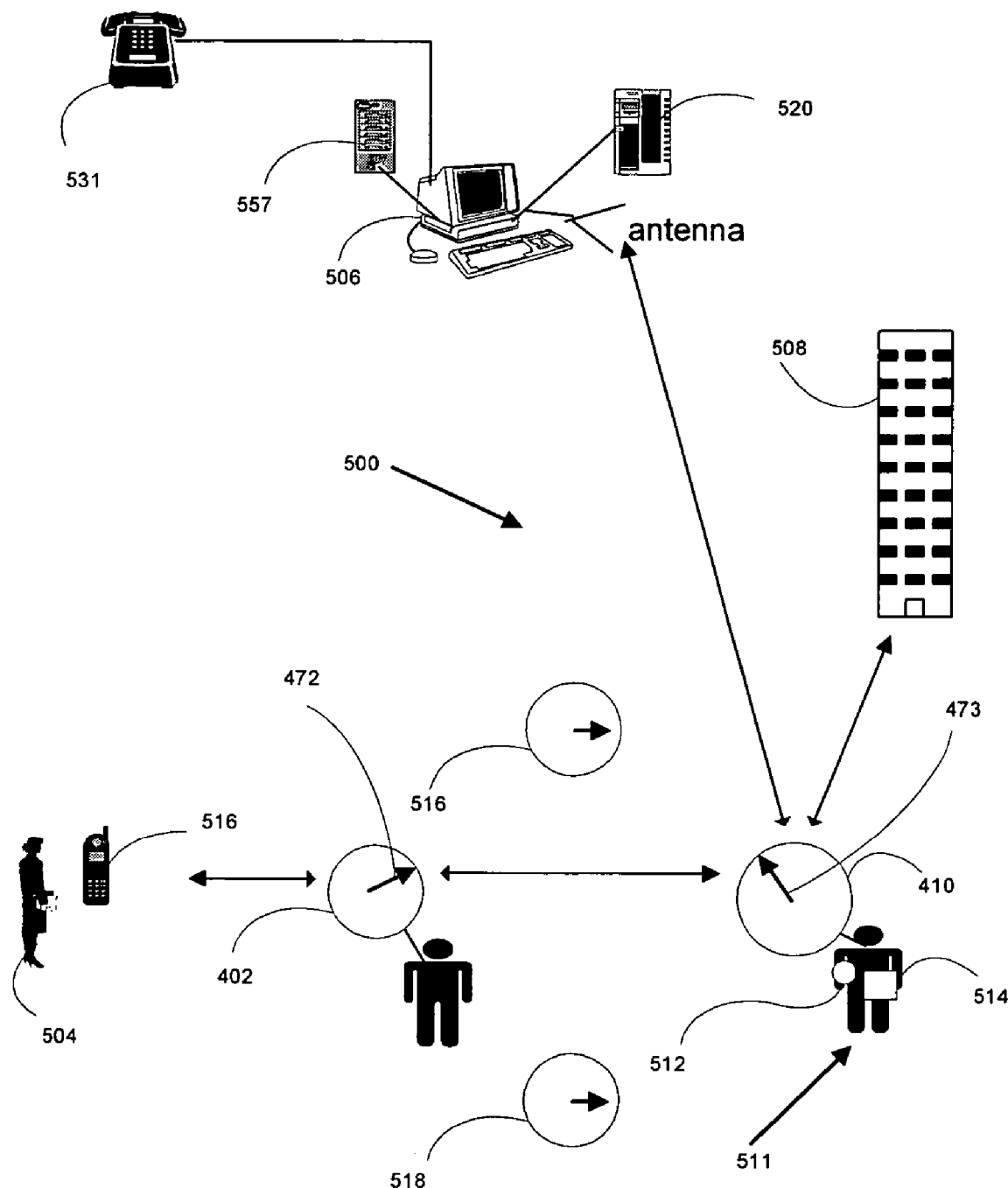
FIGS. 2A, 2B, 2C, and 2D are graphical representations of a positioning and tracking system for a second tracking device utilized to find location coordinates of a first tracking device in accordance with an embodiment of the present invention.

FIGS. 2A, 2B, 2C, and 2D illustrate a positioning and tracking system 500 for locating the first tracking device 402. Referring to FIG. 2A, the first tracking device 402 may optionally be hidden in a remote location, camouflaged, and/or incorporated as part of the individual's clothing and/or object and/or object packaging. In one exemplary instance, the first tracking device 402 is located inside a button of a sweater of the individual being tracked. The first tracking device 402 may be, in a variation of the present embodiment, pre-programmed with an identification code (e.g., a first identification code). The identification code, in one embodiment, uniquely identifies the first tracking device 402 and prevents unauthorized individuals accessing the first tracking device 402. The first tracking device 402 may be activated by an individual possessing the first tracking device 402. In one alternative, the device 402 can be remotely activated by a user 504, a monitoring station 506, a nearby base station 508, and/or a second tracking device 410. The system 500 may transmit the user's identification code (a second identification code) to the first tracking device 402, which user's identification code prevents unauthorized access to the first tracking device 402 to reduce the possibility of unauthorized device monitoring.

In one embodiment, the monitoring station 506 receives a location request and user's identification code from the user 504. Afterwards, the monitoring station 506 transmits a signal that includes the user's identification code. The location request may be from the user 504 for location data associated with the first tracking device 402. When the user 504 seeks to locate and track an object, such as a first tracking device 402, the user 504 may issue the location request to the monitoring station 506 using a communication device 516, such as a cellular phone or Personal Communications System (PCS) telephone. In other embodiments, the device 516 may be any of the following: a land-based telephone ("landline"), a computer connected to the Internet, a personal digital assistant, a radio, a pager, hand delivery, or the like. The user 504 may provide the monitoring station 506 with the user's identification code to prevent unauthorized tracking. In one example, the second tracking device 410 utilized by the user 504 determines location coordinates of the first tracking device 402, in this example, that is also owned by the user 504.

As shown in FIG. 2A, the second tracking device 410 receives a signal of a designated signal strength that includes the user's identification code. The second tracking device 410 is disposed on a second individual 511, such as a second child. The second tracking device 410 may be concealed and secured, e.g., sewn, glued, or taped, into a portion of the clothing 512 if desired. For instance, the second tracking device may be part of or concealed within a button, sweater, shirt, pocket, sleeve, or the like. In another alternative, the second tracking device 410 may be incorporated and concealed as part of the second individual's belongings 514, such as wallet, pen, pencil, tape recorder, or the like.

The second tracking device 410 compares a stored identification code with the user's identification code. If the identification codes match, e.g., are verified, then the second tracking device 410 requests information from the first tracking device 402. The second tracking device 410, in this example, requests information, such as last known or last location coordinates (such as longitudal, latitudinal and elevational position, an address, a nearby landmark and the like) from the first tracking device 402. For instance, data or positional information is determined using a wireless location and tracking system, such as GPS satellite system.

Referring to FIG. 2A, the second tracking device 410 sends a positioning signal to the first tracking device 402. Afterwards, the first tracking device 402 sends a return positioning signal. Continuing with this example, at the second tracking device 410, a phase difference and/or time delay signal is generated between the positioning signal and the return positioning signal. The phase difference and/or the time delay is converted to a delta distance between the tracking devices 402, 410 utilizing a propagation velocity of the signaling area, for example air. The second tracking device 410 communicates the delta distance and tracking data of the second tracking device 410. The delta distance and the tracking data are utilized to calculate the location coordinates, e.g., last known location or present location coordinates, of the first tracking device 402. Afterwards, the location coordinates of the first tracking device 402 are communicated by the second tracking device 410 to any or all the following: the user 504, the nearby base station 508, and monitoring station 506.

For calculating a velocity or relative change in velocity of the first tracking device 402, the relative distance, as discussed above, is calculated for multiple periods, e.g., at discrete or sequential time intervals. Distance calculations at various time intervals are utilized to determine rate of change of the tracking device 402. The rate of change, in this example, directly relates to a velocity or a relative velocity that the first tracking device 402 is moving relative to the second tracking device 410. In the alternative, the first tracking device 402 may be measured relative to another designated stationary, moving object, a tree, landmark, or WiFi network, such as one from at a local coffee shop. In one embodiment, a warning signal, which may consist of an audio response or a light display, such as pulsing light array, would result if the first tracking device 402 has a calculated velocity faster than a subscriber, e.g., user 504, set limit. For example, upon a child possessing the first tracking device 402 being detected traveling more than 60 mph, e.g., above a 55 mph limit set by the subscriber, a warning signal, such an electrical stimulation, light, sound, or the like, will be sent. The warning signal is sent to at least one of a subscriber, e.g., such as user 504 to indicate their child may have been abducted or driving an automobile faster than 55 mph, or to the child, e.g., that warns a teenager to stop driving so fast. Furthermore, the warning signal provides an audible measure of the first tracking device 402 traveling further away or closer to the second tracking device 410 without the need for the subscriber interface (as described in FIGS. 1A, 1B) to monitor the first tracking device 402.

In one variation of this embodiment, the first tracking device 402 or the second tracking device 410 may have a compass 472, 473 respectively and, in one optional step, provide a warning signal to a user 504 or an individual possessing the tracking device 402. In one application, a first boy scout has the first tracking device 402 and a scoutmaster has the second tracking device 410 so that each may determine a relative direction (and or relative movement) from each other where GPS is not available. Furthermore, the compasses 472, 473 provide discrete and private directional information so the second tracking device 410 may locate another tracking device, e.g., a first tracking device 402, without supervision and/or support of a user 504 and/or the monitoring station 506.

In the above example, the second tracking device 410 utilizes the location information stored in the first tracking device 402 when the first tracking device is out-of-range of GPS positioning satellites. Consequently, positional information and/or coordinates of the first tracking device 402 may be advantageously measured even when the first tracking device 402 is out of range (or RF shielded from), for example, of a minimum number of required GPS satellites. In yet another embodiment, additional tracking devices, a third tracking device 516 and a fourth tracking device 518, may be provided. These additional tracking devices provide additional relative distance measurements from the first tracking device 402. Consequently, these additional devices utilized as part of triangulation distance calculations may potentially increase accuracy of location coordinates of the first tracking device 402.

Figure 2B:
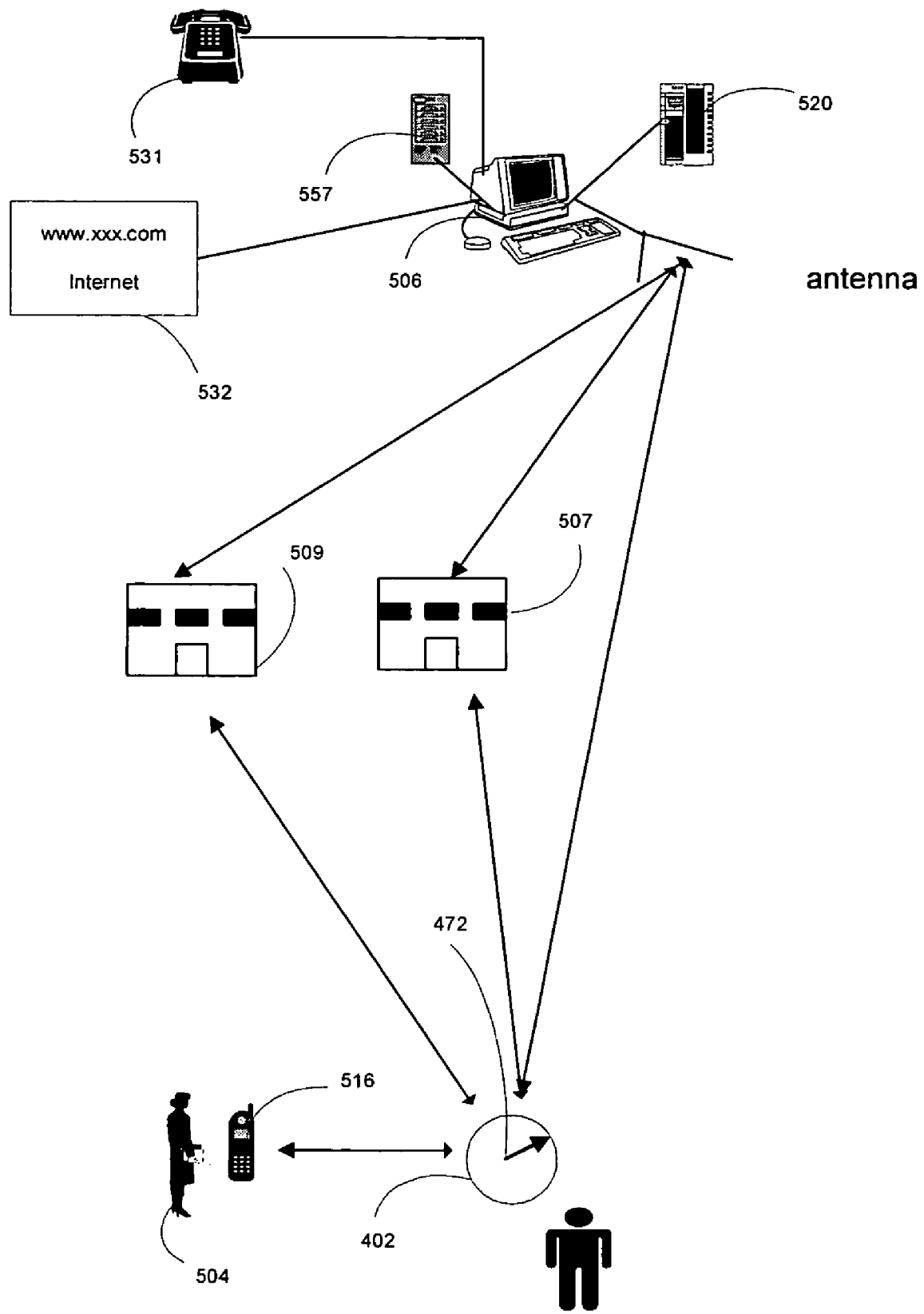

Referring to FIG. 2B, a first mobile transceiver station 509 communicates between the first tracking device 402 and the monitoring station 506. A second mobile transceiver station 507 communicates between the first tracking device 402 and the monitoring system 506. The monitoring station 506 remotely accesses the first tracking device 402 through a subscriber interface, such as subscriber interface 403 in FIGS. 2A and 2B. The subscriber interface 403 (shown in FIG. 1A) provides a screen pointer tool 401 to the subscriber (user) 504 for selecting an arbitrary shaped zone, e.g., the safe zone 405, on a map 409. Using the subscriber interface 403, the subscriber 504 communicates a first request for position coordinates of a first tracking device 402. Furthermore, the first tracking device 402 has a first transceiver, e.g., including a signal receiver 801 and a signal transmitter 815 shown in FIG. 5, to receive the first request signal and to transmit a first reply signal that comprises a first identification code. The first tracking device 402 receives a second identification code from a monitoring station 506 and compares this code to a stored identification code.

In this same embodiment, upon determining that the second identification signal code matches the stored identification code, the signal transmitter 815 (see FIG. 5) transmits its last position coordinates to the monitoring station 506. In one variation of this embodiment, low signal detection circuitry monitors received signal strength of a positioning signal. Upon the low signal detection circuitry 832 (see FIG. 5) determining received signal strength, such as when the positioning signal, e.g., global positioning signal, is detected above a defined level, the first tracking device 402 switches to a wireless location and tracking mode, e.g., GPS mode, receives positioning signal coordinates, and stores these coordinates as its current position coordinates.

In this example, the user 504 provides the location request to the monitoring station 506 by at least one of a telephone communication and an electronic message via Internet 532. The monitoring station 506 provides, in one example, the position signal to the user 504 as an electronic message over the Internet 532. In another alternative, the monitoring station 506 may provide the position signal to the user 504 as a voice message when the user 504 provides the location request by a telephone communication.

The location request and any response from the monitoring station 506 may be sent to a server 520. The server 520 may be used in cooperation with the monitoring station 506 for verifying information transmitted and received between the user 504 and the monitoring station 506. The monitoring station 506 may include a database 557 for storing the user's identification code sent by the user 504. The monitoring station 506 may compare the user's identification code received with the location request to the stored identification code in the database to determine if the user's identification code (received from the user 504 with the location request) is valid. In these embodiments, the systems 500, 505, 513, and 514 may communicate in data format only; therefore, the systems 500, 505, 508, and 510 will not compete for costly voice spectrum resources. Consequently, the present invention does not require the use of a mobile identification number (MIN). The identification codes (first identification code and second identification code) may comprise an electronic serial number (ESN).

Figure 2C:
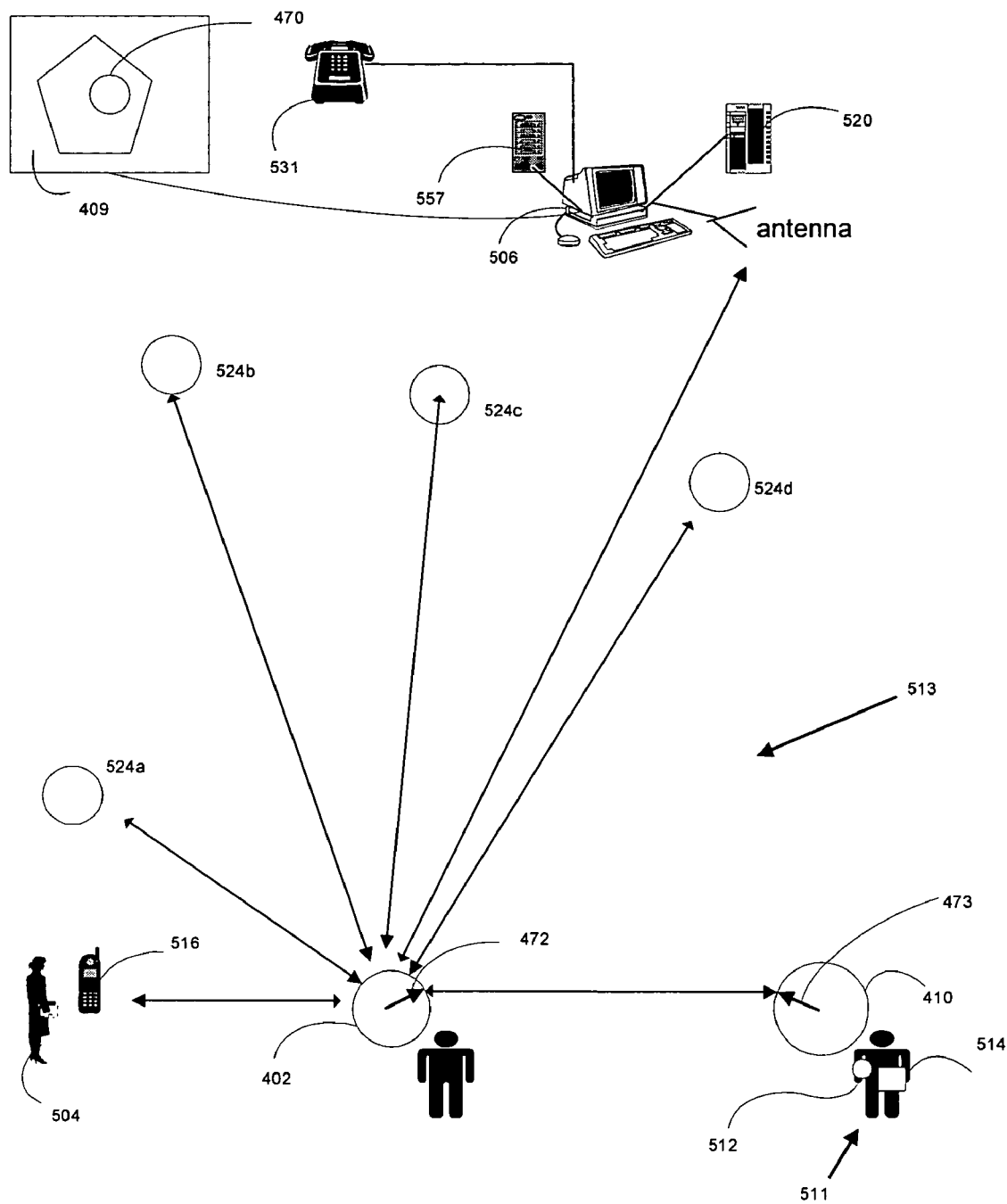

Referring to FIG. 2C, the first tracking device 402 travels within direct-line of sight of a wireless data transfer and or wireless location and tracking system. One exemplary example, the wireless data transfer and/or wireless location and tracking system is Global Positioning System (GPS). GPS satellites, for example 524*a-d*, calculate location data (such as a longitudinal, latitudinal, and elevation position, an address, a nearby landmark, and the like) of the first tracking device 402. The time it takes a global positioning system signal from a GPS satellite 524*a-d* to reach the first tracking device 402 is utilized to calculate the distance from the GPS satellite 524*a-d* to the first tracking device 402. Using measurements from multiple GPS satellites (e.g., four GPS satellites 524*a-d*), the system 513 triangulates a location for the first tracking device 402. Triangulation provides latitude and longitude information by comparing the measurements from the multiple GPS satellites 524*a-d* to the first tracking device 402. The measurements may include distances between two or more GPS satellites 524a-d and relative orientations of the GPS satellites 524a-d to the tracking device 402 and the earth. In this embodiment, the location 470 of the first tracking device 402 is, for example, updated, on any of the following update schedules: a continuous, automatic, periodic, and/or upon user request. When the user 504 requests a communication update, the location 407 is communicated to the monitoring station 506.

At the monitoring station 506, the location 470, in one embodiment, is stored. Upon a user 504 requesting the location 470 of the first tracking device 402 on their wireless device, e.g., the cell phone 516 or the like, the location 470 is displayed on a user-defined map, such as shown at map 409 in FIG. 1A. Furthermore, the monitoring station 506 may track also the second tracking device 410 on the display 400 (shown in FIG. 1). As such, location coordinate measurements and warnings of the first tracking device 402 and the second tracking device 410 may be coordinated, monitored, and/or tracked, including relative distances between the devices 402, 410. The user 504 may remotely monitor the devices 402, 410 using the cell phone 516.

In contrast, conventional monitoring systems had limited capability of monitoring multiple tracking devices, such as requiring a centralized monitoring station, limited remote access to tracking device information for users, and limited mapping capabilities. In the present invention, the monitoring device 506 and the cell phone 516 allow multiple tracking devices, such as 402, 410, to be remotely monitored, coordinated and distance within or from a safe zone calculated, even when not within a line-of-sight of a wireless location and tracking system. Furthermore, a user 504 defines the safe zone 405, as shown in FIG. 1A, which option increases display monitoring accuracy by providing precise boundaries for safe and unsafe zones and displaying the first and second tracking devices either inside or outside the boundary.

Figure 2D:
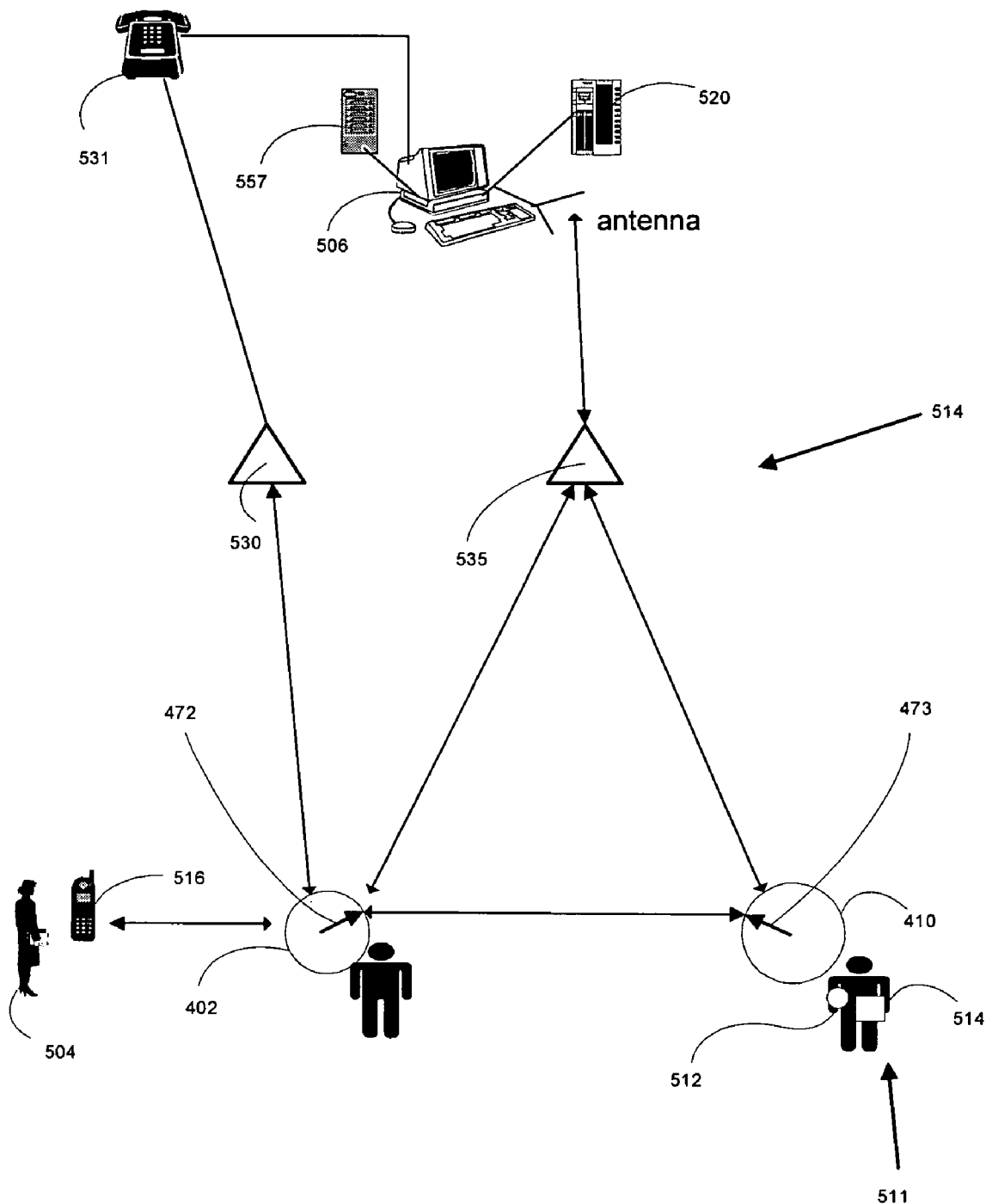

Referring to FIG. 2D, another wireless data transfer, and wireless location and tracking system is disclosed. This system includes a first transmitter/receiver station 530, e.g., a base station, for communicating between the first tracking device 402 and monitoring station 506. The first transmitter/receiver station 530 may be connected to a wireless network operator (not shown) and a public switched telephone network (PSTN) 531. A user's identification code may be sent within a signal to the first transmitter/receiver station 530. The signal may then be sent from the first transmitter/receiver station 530 to the tracking device 402. In the system 514, a second transmitter/receiver station 535 may be utilized to locate and track the first tracking device 402. The second transmitter/receiver station 535, in this example, communicates location coordinates between the first tracking device 402, the second tracking device 410, and the monitoring station 506. By triangulating positional coordinates between and among the first and second stations 530, 535 of the first tracking device 402, similar to discussions associated with FIGS. 2a-d and FIG. 3, location coordinates of the first tracking device 402 are computed.

Figure 3:
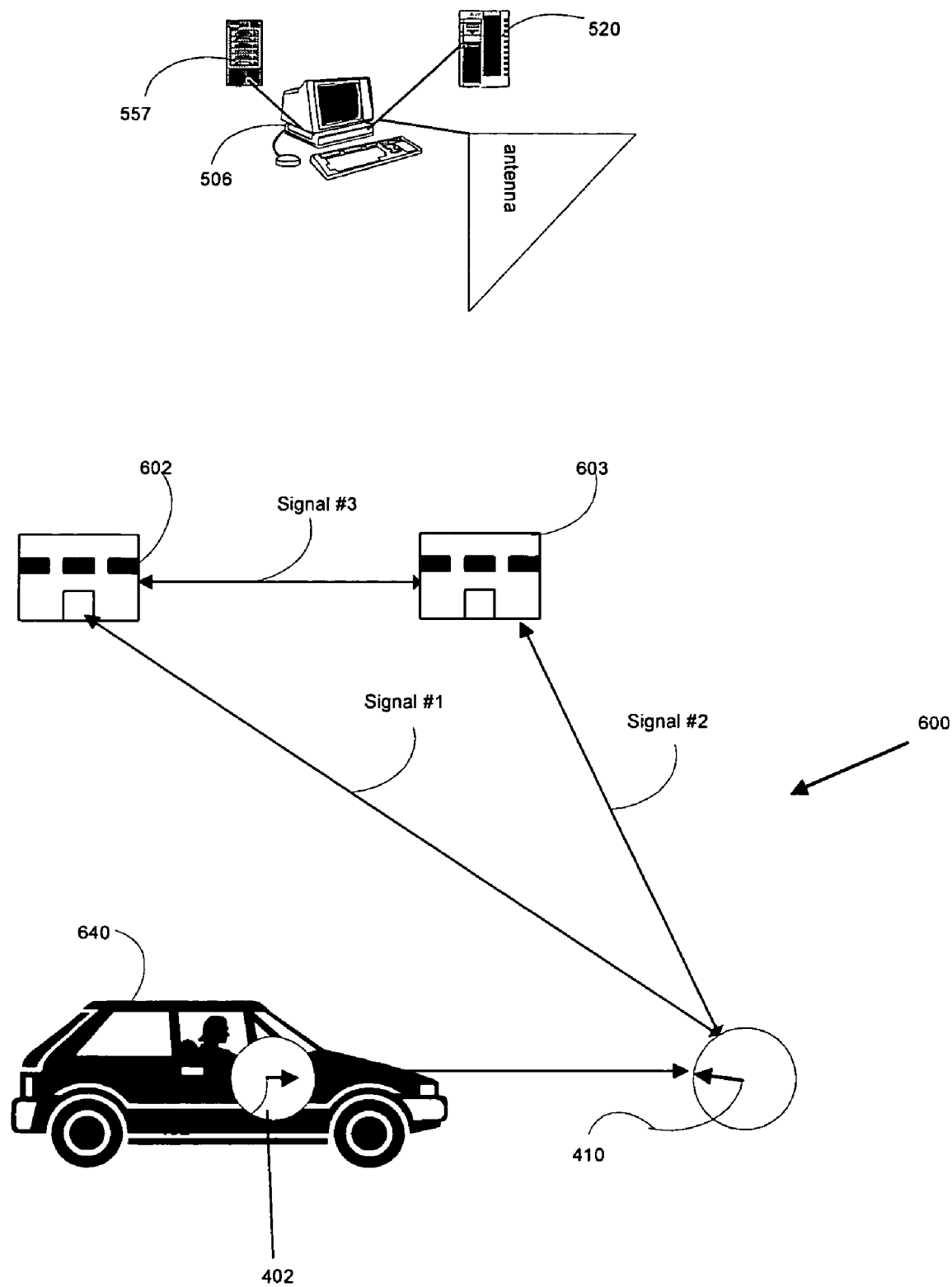
FIG. 3 is a graphical representation of a positioning and tracking system utilizing a wireless communication system to determine location coordinates for the first tracking device in accordance with an embodiment of the present invention.

FIG. 3 illustrates a positioning and tracking system utilizing a wireless communication system to determine location coordinates for the first tracking device in accordance with an embodiment of the present invention. In this example, the wireless communication system (WCS) is General Packet Radio Service (GPRS). General Packet Radio Service (GPRS) signals locate and track the first tracking device 402. GPRS is a non-voice service that allows information to be sent and received across a mobile telephone network. GPRS may supplement Circuit Switched Data (CSD) and Short Message Service (SMS). In yet another exemplary wireless data transfer and/or wireless location and tracking system, upon the first tracking device 402 not being accessible by GPS or other communication means, a plurality of transmitter/receiver stations may be utilized. For example, the first transmitter/receiver station 602, e.g., a mobile base station, and the second transmitter/receiver station 603, e.g., a mobile base station, may be deployed. These stations 602, 603 send location coordinates of the first tracking device 402 through the second tracking device 410 and the monitoring station 506. The first transmitter/receiver station 602 communicates with the second tracking device 210 with Signal #1. The second transmitter/receiver station 603 communicates with the second tracking device 410 with Signal #2. In this same example, Signal #3 may serve to communicate between the first transmitter/receiver station 602 and the second transmitter/receiver station 603.

By triangulating the location of the second tracking device 410, a location may be determined for the second tracking device 410. Following, a relative distance, as discussed above in FIGS. 2a-d, is determined between the second and the first tracking devices 410, 402. Afterwards, the location coordinates of the first tracking device 402 are obtained using the location of the second tracking device 410 and a delta distance, e.g., relative distance, of the first tracking device 402 from the second tracking device 410.

The tracking device 402 may be associated with an object, such as an automobile 620. By placing the first tracking device 402 anywhere within or on the automobile 640, the system 600 may locate and track the automobile 640. Likewise, the system 600 may be used for locating and tracking an individual. The individual, such as a child, may be located and tracked when the individual, such as shown in FIGS. 2a-d, possesses the first tracking device 402. For example, the individual (similar to the individual in FIG. 2 for the second tracking device 410) may carry the first tracking device 402 in a pocket in the individual's clothing, in a backpack, wallet, purse, a shoe, or any other convenient way of carrying. As described above, locating and tracking the individual may be accomplished through use of a Signal #1 and #2.

It is to be understood that although the automobile 640 and the individual are herein used to exemplify locating and tracking, the system 600 may be used to locate and track many other objects, inanimate (such as merchandise or any vehicle, vessel, aircraft, etc.) and animate (such as pets, domesticated animals, or wild animals).

Figure 4:
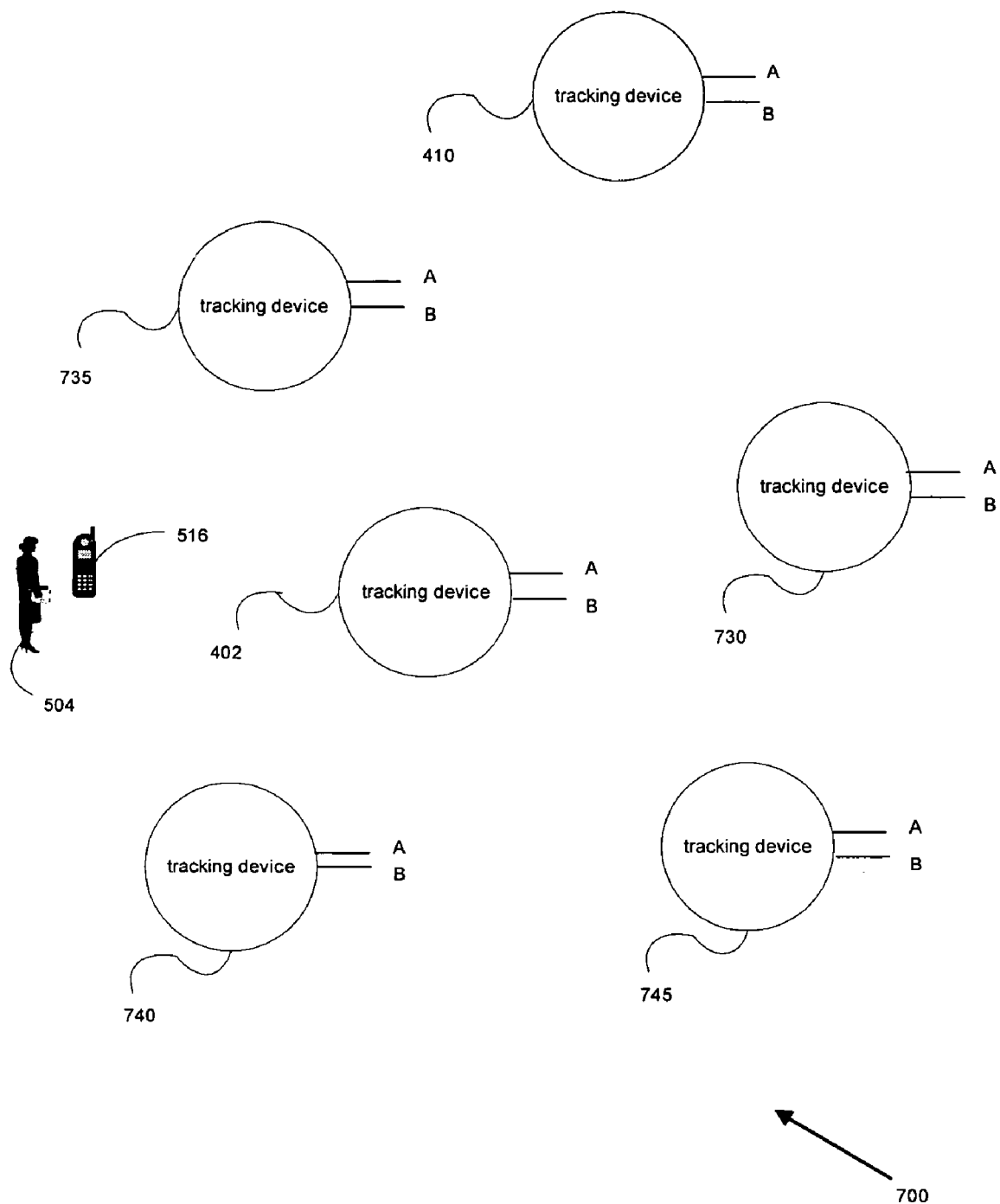
FIG. 4 is a graphical representation of a positioning and tracking system 700 for locating a first tracking device 402 using other user's tracking devices.

FIG. 4 shows a plan view of a positioning and tracking system 700 for locating a first tracking device 402 using other user's tracking devices. In one variation of FIG. 1, a user 504 may receive permission or previously have received permission to utilize the tracking device 735. In this example, the tracking device 735 is owned by another user. When the tracking device 735 is located within a communication range of the first tracking device 402, the user 504 may request its use by providing a proper identification number. In yet another variation, groups of users, such as owners of tracking devices 730, 735, 740, and 745, etc. may pool their resources so that any of these devices are available to others in the group.

In other words, the group of owners for 730, 735, 740, and 745 may utilize other users tracking devices, e.g., like those near a desired device to track. In one alternative embodiment, each of the group of owners shares security codes. In this alternative embodiment, each owner of the group has permission to limit usage of their tracking device to others of group members (as well as others outside of the group of users). Furthermore, each of the tracking devices 730, 735, 740, and 745 may have one or more communication channels, such as A, B, C, D, etc . . . . Consequently, multiple users of the group may utilize different channels on the same tracking device(s) to determine location coordinates in a substantially simultaneous and/or sequential manner for each of their tracking devices during a specified period (for example one specified by a subscriber). For instance, the tracking device 730 may have four communication channels, e.g., A, B, C (not shown), D (not shown), where A is utilized to track the first tracking device 402 and B is utilized to track the second tracking device 410 during a substantially similar period.

Figure 5:
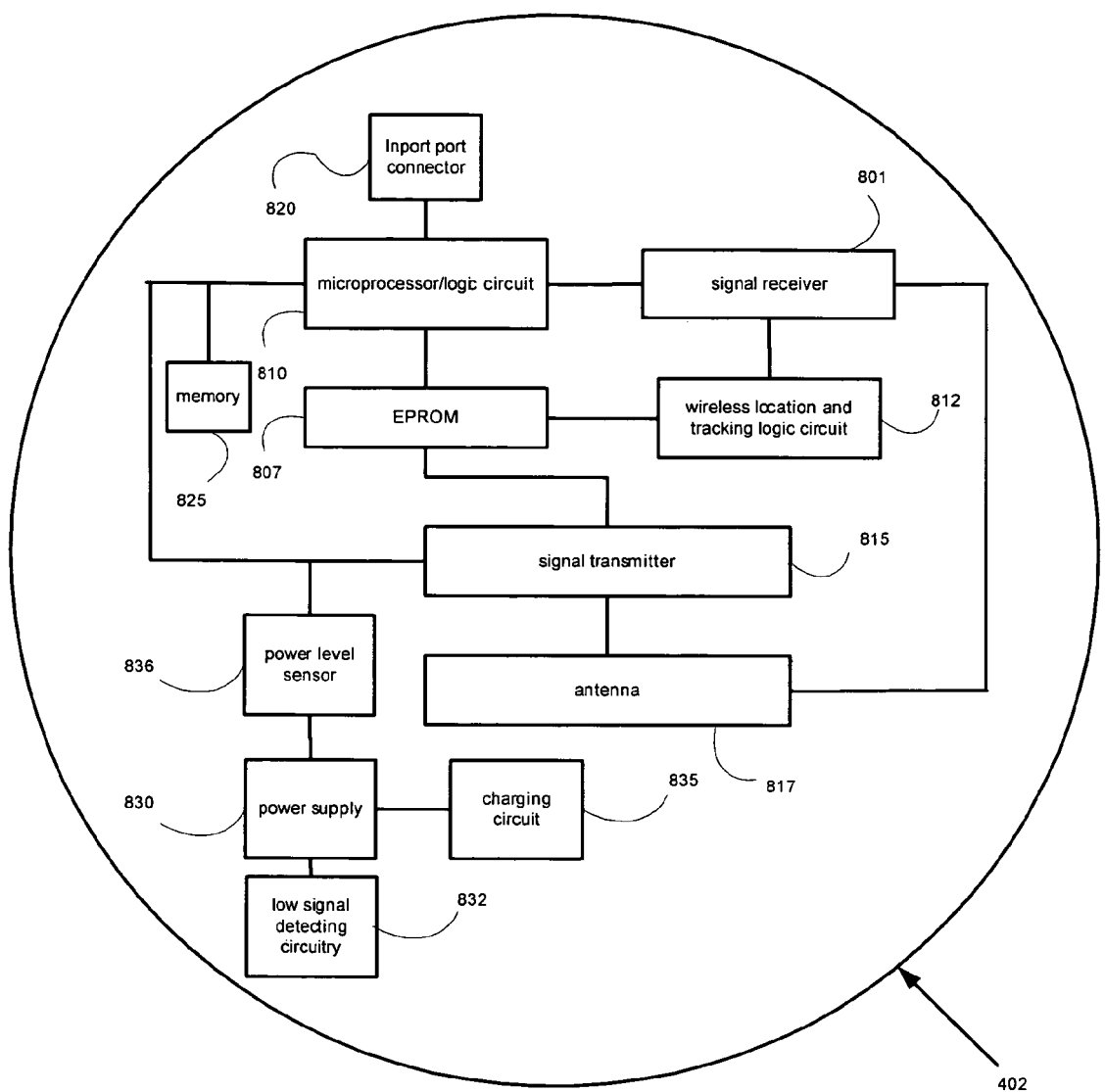
FIG. 5 is a functional block diagram of the first tracking device in accordance with an embodiment of the present invention.

FIG. 5 is a block diagram of the first tracking device 402 in accordance with an embodiment of the present invention. The tracking device 402 may comprise a signal receiver 801 for receiving a signal from the monitoring station 506 (shown in FIG. 2). The signal may include the user's identification code (second identification code), sent by the user 504 (shown in FIG. 2). The first tracking device 402 may comprise a microprocessor/logic circuit 810. The microprocessor/logic circuit 810 may store a first identification code to produce a stored identification code, determine a location of the first tracking device 402, and generate a position signal that contains location data (such as a longitudinal, latitudinal, and elevational position, an address, a nearby landmark, and the like) for the tracking device 402.

The tracking device 402 may further comprise an erasable programmable read-only memory (EPROM) 807 for storing operating software for the microprocessor/logic circuit 810. A positioning system logic circuit 812 may be used for calculating location data (such as a longitudinal, latitudinal, and elevational position, an address, a nearby landmark, and the like) for the first tracking device 402 to be sent to the microprocessor/logic circuit 810 and subsequent transmission to the monitoring station 506 (shown in FIG. 2).

The tracking device 402 may comprise a signal transmitter 815. In one embodiment of the invention, a single transceiver may be substituted for the signal transmitter 801 and the signal transmitter 815. An antenna 817 may be connected to the signal transmitter 815 and an antenna 817 may be connected to the signal receiver 800. The signal transmitter 815 may allow the first tracking device 402 to transmit a signal to the monitoring station 506 (shown in FIG. 2) and thus transmit location data (such as a longitudinal, latitudinal, and elevation position, an address, a nearby landmark, and the like). The signal receiver 801 may allow the first tracking device 402 to receive the signal from the monitoring station 506 (shown in FIG. 2) to allow the user 504 (shown in FIG. 2) to send a location request by at least one of a telephone communication and an electronic message via the Internet.

An input port connector 820 may be connected to the microprocessor/logic circuit 810 for inputting the stored identification code (first identification code) for storage in memory 825. The microprocessor/logic circuit 810 may be connected to receive operating power from a power supply 830. The power supply 830 may be any type of battery that is small enough to fit inside of the tracking device 402. A charging circuit 835 may be connected to the power supply 830 for recharging the power supply. The charging circuit 835, for example, may be a charging circuit such that an external magnetic battery recharger may provide recharging electricity to the charging circuit 835 for recharging the power supply 830 whenever the power falls below a predetermined level.

A power level sensor 836 may be connected between the power supply 830 and the microprocessor/logic circuit 810 for sensing the power level of the power supply 830 and providing the sensed power level to the microprocessor/logic circuit 810. The microprocessor/logic circuit 810 may generate a power level signal to be transmitted with the signal transmitted.

Figure 6A:
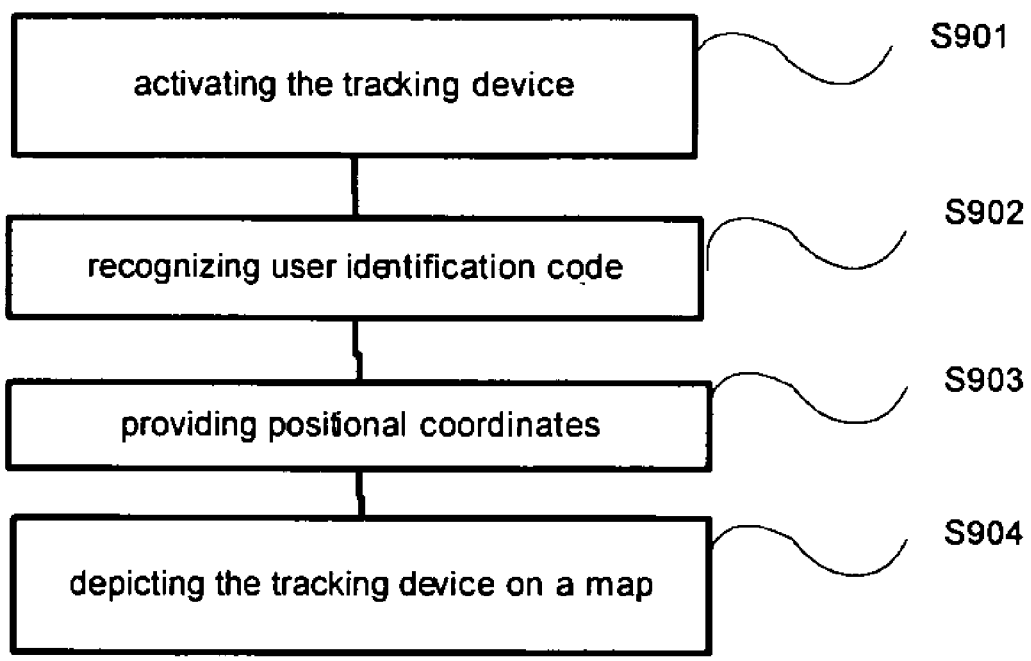
FIGS. 6A, 6B are a logical flow diagrams illustrating one exemplary embodiment of a method for locating an individual or an object in accordance with an embodiment of the present invention.
Figure 6B:
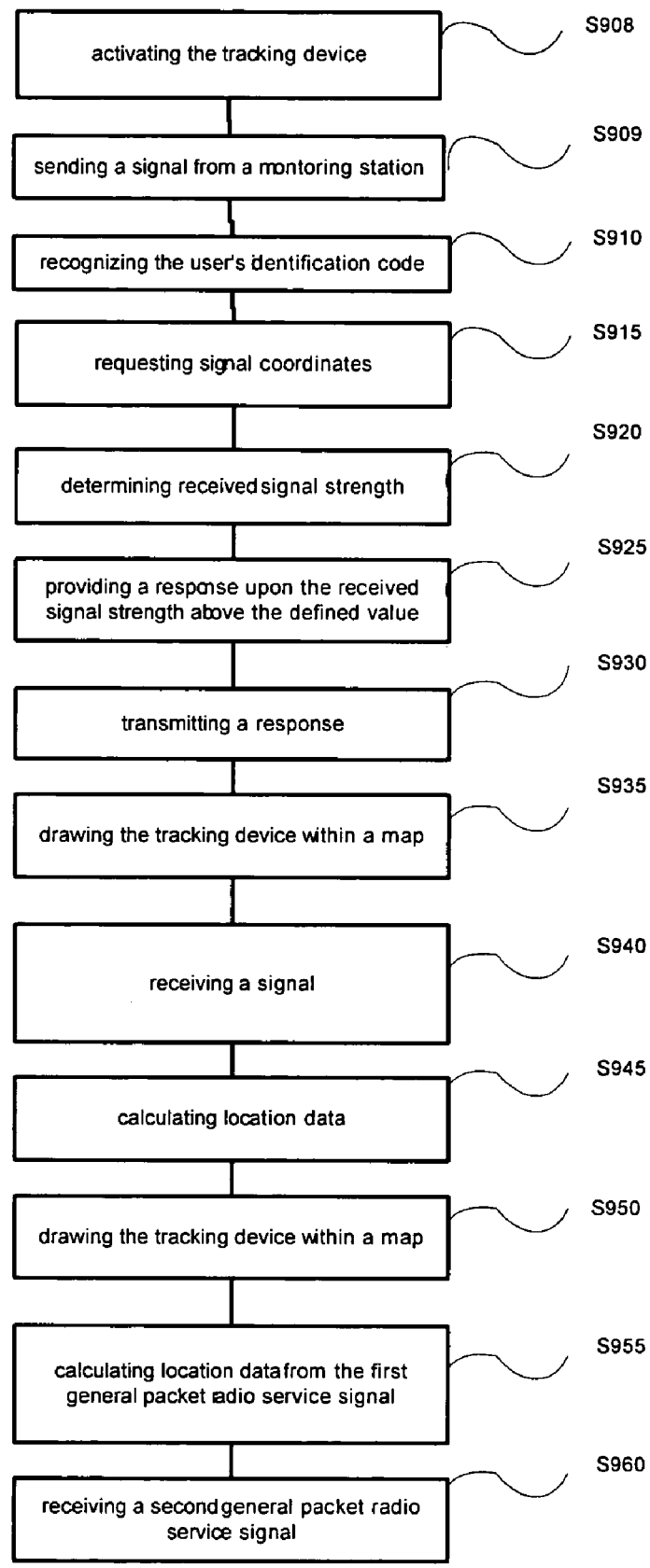

FIG. 6A, 6B are a logical flow diagrams illustrating one exemplary embodiment of a method 900 for locating an individual or an object in accordance with another embodiment of the present invention. This method is based on components previously discussed in FIGS. 2a-d and 3.

As shown in one embodiment as depicted in FIG. 6A, a location request sent from a monitoring station is received at an activated tracking device (S901). Upon recognizing a user identification code (S902), the activated tracking device's positional coordinates are provided (S903). A rendering of the activated tracking device is placed on a map; the map depicts the activated tracking device's position relative to a user designated safe zone (S904).

As shown in another embodiment as depicted in FIG. 6B, the tracking device is activated (S908). A monitoring station sends a signal and the signal is received at the tracking device—the signal includes a location request and optionally a user's identification code (S909). The tracking device recognizes the user's identification code as a location request pertaining to the tracking device (S910).

System signal coordinates are being requested (S915). In step S920, a level of a received signal strength of the positioning satellite coordinates is determined if it is above a defined value (S920). In one embodiment, upon the received signal strength being above the defined value, a response is formatted and provided for the location request including the positioning satellite coordinates, where the response includes location data pertaining to the tracking device (S925). The response is transmitted to a server (S930). The tracking device location is drawn within a map that comprises a safe zone (S935). The tracking device location is drawn within a map using a mapping service, such as the Kivera Location Engine™ provided by Kivera, Incorporated of Oakland, Calif., in the United States or the MapQuest™ mapping service provided by MapQuest, Incorporated of Denver, Colo, in the United States.

The mapping service may use location data, such as the longitudinal, latitudinal, and elevational position, to provide an address near the location tracked ("nearest location address") comprising a street name, postal code (zip code) or a nearest known landmark. The mapping service may then forward the location data to the user 504 (FIG. 2) via the monitoring station 506 (FIG. 2).

The method may further comprise the additional step (S940) of receiving a positioning system signal from a positioning satellite, and a step (S945) of calculating location data from the positioning system signal. The method may further include the step (S950) of receiving a first general packet radio service signal from a first transmitter/receiver station.

The method may also include the step (S950) of calculating location data from the first general packet radio service signal. The method may further comprise the additional step (S955) of receiving a second general packet radio service signal from a second transmitter/receiver station and may comprise calculating location data from the second general packet radio service signal.

Figure 7A:
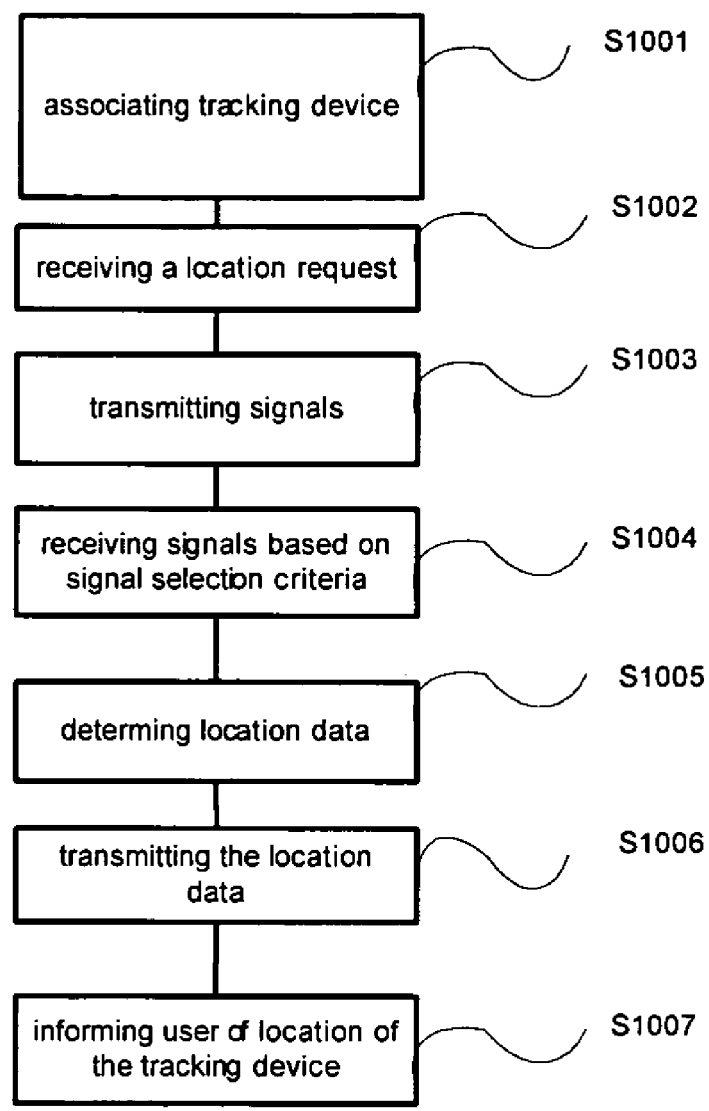
FIGS. 7A, 7B are logical flow diagrams illustrating another exemplary embodiment of a method for locating an individual or an object in accordance with another embodiment of the present invention.
Figure 7B:
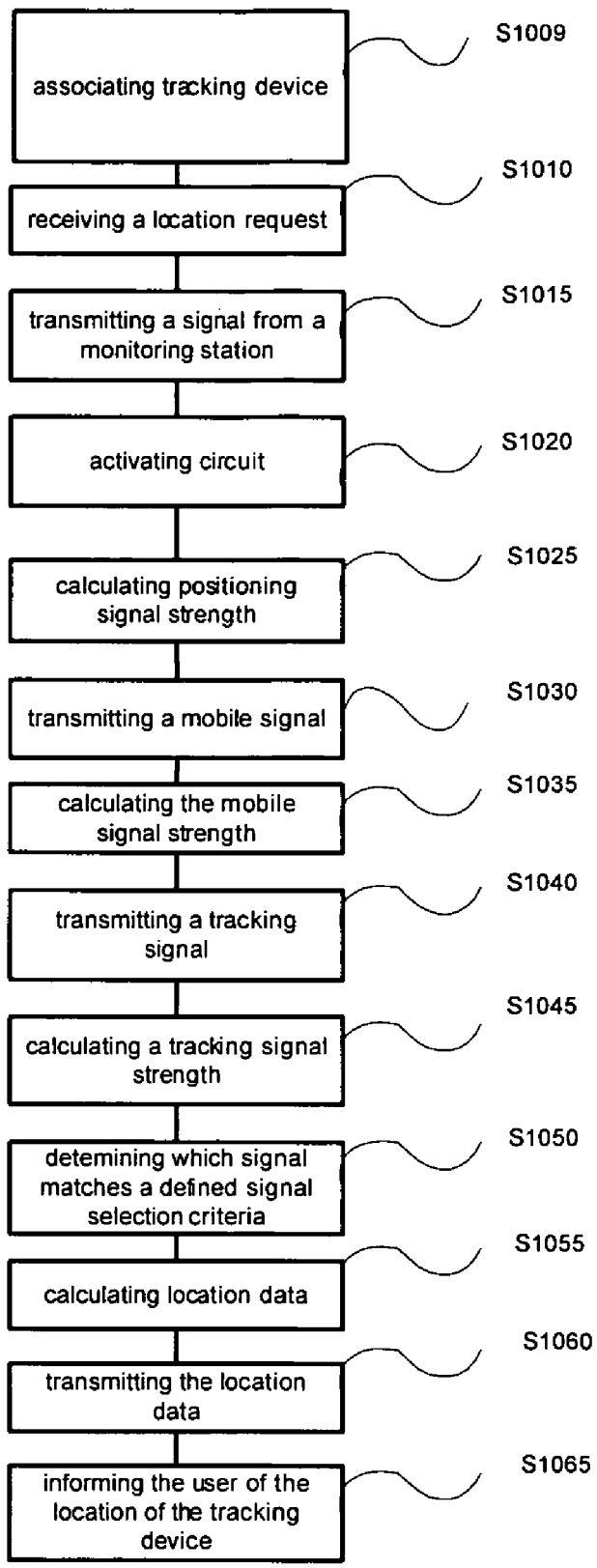

FIGS. 7A, 7B are logical flow diagrams illustrating another exemplary embodiment of a method for locating an individual or an object in accordance with another embodiment of the present invention. This method is based on components previously discussed in FIGS. 2a-d and 3.

In FIG. 7A, one embodiment of the method is disclosed. In this embodiment, a tracking device is associated with an individual or an object (S1001). A location request is received from a user (S1002). Signals are transmitted to the tracking device from one or more locations, for example, from a monitoring station, a wireless location and tracking station, a mobile transceiver, and an adjacent tracking device (S1003). Based on signal selection criteria, the tracking device at least one signal is selected (S1004). The signal selection criteria, in one example, may be based on signal strength level, availability of signal, and/or ownership of a system providing the at least one signal. Location data is determined in part based on the signal selection criteria (S1005). The location data is transmitted to the monitoring station, for example, for further processing (S1006). A user is informed of the location of the tracking device on a map (S1007).

In FIG. 7B, another embodiment of the method for locating an individual or an object is disclosed. In this method, a tracking device is associated with the individual or the object to be located (S1008). A location request is received from a user (S1010). A signal is transmitted from a monitoring station to the tracking device (S1015). Following, a positioning system circuit is activated within the tracking device (S1020). A positioning signal strength of a received positioning system signal is calculated (S1025). A mobile signal is transmitted from a mobile transceiver to the tracking device (S1030).

A mobile signal strength is calculated of a received mobile signal (S1035). A tracking signal is transmitted from an adjacent tracking device (S1040). A tracking signal strength is calculated of a received tracking signal (S1045). Determining which of the positioning system signal, the received mobile signal, and the received tracking signal match a defined signal selection criteria stored in the tracking device (S1050).

Location data is calculated based in part on a signal selected utilizing the defined criteria (S1055). The location data is transmitted to the monitoring station for analysis to determine a location of the tracking device (S1060). A user is informed of the location of the tracking device on a map (S1070). It is noted that many variations of the methods described above may be utilized consistent with the present invention. Specifically, certain steps are optional and may be performed or deleted as desired. Similarly, other steps (such as additional data sampling, processing, filtration, calibration, or mathematical analysis for example) may be added to the foregoing embodiments. Additionally, the order of performance of certain steps may be permuted, or performed in parallel (or series) if desired. Hence, the foregoing embodiments are merely illustrative of the broader methods of the invention disclosed herein.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A system comprising:
    a first tracking device having a first transceiver configured to receive a first request signal and to transmit a first reply signal that comprises first location data, a first microprocessor configured to process a first request signal provided through a user interface that is remotely located, and a first identification code communicated as part of a first reply signal; and
    a second tracking device having a second tracking transceiver adapted to receive the first reply signal, and verify the first identification code as a recognized code, and in response communicate a second reply signal that comprises a second identification code to the first tracking device;
    wherein the first tracking device is adapted to calculate, in response to the second reply signal, a distance between the first and the second devices, and communicate an adjustment signal that comprises at least one of verbal and audio queues that indicates directional information of the first tracking device relative to the second tracking device.

2. The system of claim 1, further comprising a monitoring station that is remotely accessible through the user interface;
    wherein the user interface provides a map and a screen pointer tool for selecting an arbitrary shaped zone on the map, and communicates the first request for location coordinates of the first tracking device; and
    wherein the user interface is a web-based interface that provides a selection of at least one of (i) known safe street addresses, (ii) safe zipcodes, and (iii) safe distances between the first tracking device and a designated safe location.

3. The system of claim 1, wherein the user interface further comprises a notification function that is configured to generate an alert upon the first tracking device being detected outside a safe zone.

4. The system of claim 2, wherein the map is configured to display selected tracking devices that are located a specified distance from a first tracking device; and upon appropriate security permissions, provide the user capability to utilize the selected tracking devices to assist determining the location coordinates of the first tracking device.

5. The system of claim 2, wherein the map is configured to display other tracking devices that are a user-defined distance from the first tracking device; and upon appropriate security permissions, provide the user capability to utilize the other tracking devices to determine in part the location coordinates of the first tracking device.

6. A system comprising:
    a first mobile transceiver station configured to communicate between a first tracking device and a monitoring station; and
    a second mobile transceiver station configured to communicate between the first tracking device and the monitoring station;
    wherein the monitoring station is remotely accessible through a user interface, the user interface being configured to provide a map and a designation tool for use in selecting a zone on the map, and communicate a first request for position coordinates of the first tracking device;
    wherein the first tracking device comprises a first transceiver configured to receive the first request signal and to transmit a first reply signal that comprises a first identification code; and
    wherein the first tracking device is adapted to receive a second identification code from the monitoring station and compares this code to a stored identification code, and upon determining that the second identification code matches the stored identification code, transmit its position coordinates to the monitoring station.

7. The system of claim 6, further comprising low signal detection circuitry configured to monitor received signal strength of a positioning signal;

wherein the first tracking device is configured to switch to a wireless location and tracking mode upon the low signal detection circuitry determining that the received signal strength is above a defined level, receive the position signaling coordinates, and store the positioning signal coordinates as its position coordinates.

8. The system of claim 6, wherein upon a user request, the position coordinates are determined utilizing at least two of the following position calculation modes: positioning satellites, tracking device to tracking device, and a mobile transceiver system.

9. A method for locating a tracking device, comprising:
activating the tracking device;
receiving a signal sent from a monitoring station to the tracking device, the signal including a user's identification code;
recognizing the user's identification code as a location request pertaining to the tracking device;
requesting positioning coordinates;
formatting a response to the location request including the positioning coordinates, the response including location data pertaining to the tracking device in part response to a level of the signal;
transmitting the response to a server; and
rendering the tracking device location within a map that contains a user-defined arbitrary shaped safe zone.

10. The method of claim 9, further comprising:
upon determining that the received signal strength being below the defined value, a first mobile station signal and a second mobile station signal that comprise respective positional coordinates are communicated to the tracking device; and
determining a positional location of the tracking device utilizing the respective positional coordinates.

11. A method of determining location via a tracking device associated with an individual or an object to be located, the method comprising:
receiving a location request from a user;
activating a positioning apparatus associated with the tracking device;
transmitting to the tracking device:
(i) a first signal from a monitoring station;
(ii) a second signal from a wireless location and tracking system;
(iii) a third signal from a mobile transceiver; and
(iv) a fourth signal from an adjacent tracking device;
determining which of the first signal, the second signal, the third signal, and the fourth signal match defined selection criteria stored in the tracking device;
determining location data in part based on a signal selected utilizing the defined selection criteria;
transmitting the location data to the monitoring station for analysis to determine a location of the tracking device; and
informing the user of the location of the tracking device on a map.

12. The method for locating an individual or an object of claim 11, wherein the signal transmitted from the monitoring station to the tracking device includes a user's identification code.

13. The method for locating an individual or an object of claim 11, wherein the tracking device includes;
a signal receiver adapted to receive the signal from the monitoring station to the tracking device, including a user's identification code;
a microprocessor/logic circuit adapted to store an identification code to utilize as a stored identification code, to determine a location of the tracking device, and to generate a positioning signal;
a programmable memory;
a wireless location and tracking system logic circuit; and
a signal transmitter.

14. The method of claim 12, wherein the tracking device compares the user's identification code to a stored identification code and upon determining that the user's identification code matches the stored identification code, a signal transmitter from the tracking device transmits a positioning signal to the monitoring station.

15. The method of claim 11, further comprising:
calculating speed of the tracking device; and
providing a warning signal to at least one of the user, a subscriber of this method, the individual, or the object when movement of the tracking device exceeds a designated value.

16. The method of claim 11, further comprising the step of:
communicating at least one of a verbal or electronic signaling warning when the tracking device is detected more than a designated distance from a designated coordinate position.

17. A system comprising:
a wireless monitoring device associated with a remote user;
a first tracking device that provides a wireless positioning signal to a monitoring station; and
a mapping apparatus that maps first location coordinates of the first tracking device on a map comprising an arbitrarily shaped safe zone;
wherein the remote user is capable of locating, tracking, and communicating with the first tracking device through a monitoring station;
wherein the monitoring station is adapted to monitor the first location coordinates and second location coordinates of a second tracking device so that positioning information of each is accessible to the remote user; and
wherein the wireless monitoring device comprises a cellular phone that accesses remote user selectable maps in response to the first location coordinates and the second location coordinates; and
user selection criteria configured to allow a subscriber, remote user, or a user to choose a method of determining location coordinates, the user selection criteria selected based on performance characteristics of the system;
wherein the system is selected from the group consisting of: a wireless locating and tracking system, and a wireless communication system.

* * * * *